SONIC TRANSMITTER

Original Filed June 23, 1958

INVENTORS
HENRY NEIL FRIHART
BY JAMES J. KRAKORA JR.
Mueller & Aichele
ATTYS.

3,235,836
SONIC TRANSMITTER

Henry Neil Frihart, La Grange Park, and James J. Krakora, Jr., Chicago, Ill., assignors to Motorola, Inc., Chicago, Ill., a corporation of Illinois

Original application June 23, 1958, Ser. No. 743,792, now Patent No. 3,044,016, dated July 10, 1962. Divided and this application May 28, 1962, Ser. No. 198,026
2 Claims. (Cl. 340—15)

This application is a division of our copending application, Serial Number 743,792, filed June 23, 1958, now Patent No. 3,044,016.

This invention relates to remote control systems and more particularly to an improved and simplified remote control transmitter to produce radiated signal energy to perform one or more control functions. Patent 3,044,016 describes and claims other aspects of a remote control system.

One of the more widespread uses for remote control systems is in the adjustment of present day television receivers since a television viewer generally sits beyond convenient reach of the receiver, and remote control apparatus can provide the necessary adjustments from the viewer's position. Remote control apparatus of this kind should be of a "wireless" type and of comparatively simple and low cost construction in order to be readily saleable with television receivers. On the other hand, the controls available with such apparatus should be powerful enough to operate properly over distances encountered in television control situations and should be sufficiently selective of the control signal to avoid false operation due to spurious signals. While sound energy has been used in the prior art for receiver remote control purposes, the systems have not been altogether satisfactory for the purposes outlined due to the lack of simplified control of the functions to be remotely performed, and the overall complexity and cost of multi-function systems rendering such systems relatively expensive and unreliable in use.

An object of the present invention is to provide an improved and simplified remote control transmitter to produce sonic energy for control purposes.

Another object is to provide a remotely controlled television receiver using a control unit of small size but yet of sufficient power for reliable operation over television viewing distances.

Another object is to provide a remote control system for television receivers which system is simple and convenient to operate for rapidly and accurately performing a plurality of television receiver control functions.

A feature of the invention is the provision of a small, unitary control transmitter providing different continuous supersonic signals and a control receiver responsive to reception of such signals for controlling electromechanical devices to operate controls such as the tuning or volume controls of a television receiver.

Another feature is the provision of an improved miniature, transistorized, supersonic oscillator having control switches for connecting different frequency determining elements into the oscillator circuit for generating control signals of different frequencies.

A further feature is the provision of such a transistorized oscillator utilizing hollow, magnetostrictive rods through which feedback signals for the oscillator are maintained, and an air coupling disc supported on each rod having a diameter substantially equal to a multiple of the signal wave length thereby maximizing energy coupling from the transmitter.

Further objects, features and the attending advantages of the invention will be apparent upon consideration of the following description when taken in conjunction with the accompanying drawings in which.

In a preferred form of the invention, there is provided a remote control system particularly adapted for adjusting a television receiver channel selector mechanism, the on-off switch of the receiver, or the level of the receiver volume all from a remote viewing position. The remote transmitter is a small unit, suitable to be held in the hand of an operator, and incorporating a transistorized oscillator. The oscillator frequency is controlled by feedback through one or more magnetostrictive rods. A radiating diaphragm is supported by each rod for coupling energy to the air and maximizing sound energy transfer at the particular magnetostrictive frequency of the rod. Switch means in the transmitter provide selection of which a plurality of oscillator frequencies is transmitted.

Figure 1:
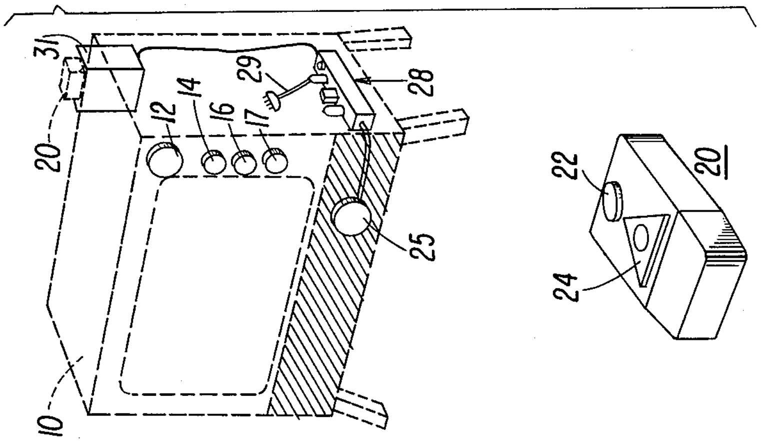
FIG. 1 is a perspective view showing the remote control transmitter and receiver as they may be used in conjunction with the television receiver.

In FIG. 1 the television receiver 10 includes a channel selector knob 12, a volume and on-off switch control 14 as well as contrast and brightness controls 16 and 17. The remote control transmitter unit 20 which may be of a size small enough to be conveniently carried in the hand of a user, includes transmitter energizing switches 22 and 24, operation of which provide respectively in the associated television receiver an on-off control and channel selection. When energized, the transmitter 20 emits supersonic radiation from the end thereof adjacent pushbutton switch 22 and this energy is received by transducer 25 located behind the speaker grill of the television receiver 10. Transducer 25 is connected to a remote control receiver unit 28 which provides control potentials in response to the transmitted supersonic energy and these potentials are used to control suitable motors for operation of the controls of the receiver 10, as is explained in the aforesaid copending application. The receiver unit 28 includes a cable 29 for connection to the television receiver circuit.

On the back panel of the television receiver a cradle 31 is supported in a position to conveniently receive the transmitter unit 20 when the television receiver is not in use.

Figure 3:
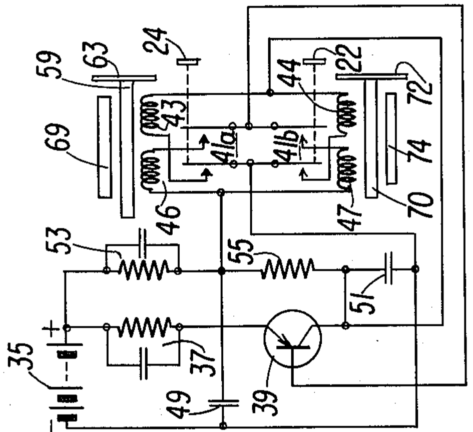
FIG. 3 is a schematic diagram of the remote control transmitter circuit.
Figure 2:
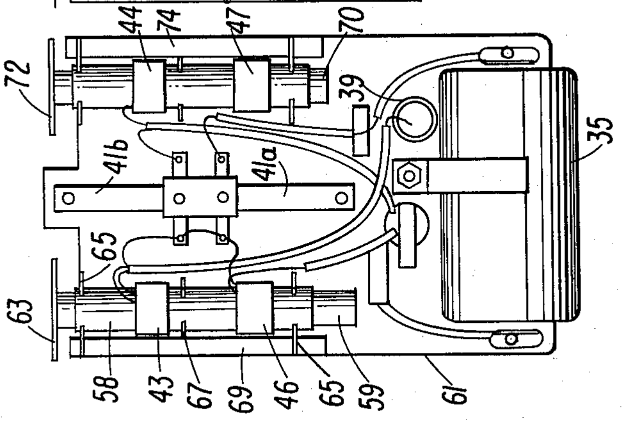
FIG. 2 is a view of the chassis of the remote control transmitter of the invention.

FIGS. 2 and 3 show respectively the physical arrangement of certain of the transmitter components and a diagram of the circuit of the transmitter. The positive terminal of battery 35 is connected through the bypassed bias network 37 to the emitter of transistor 39. The base electrode of transistor 39 is connected to portions of switch sections **41*a* and 41*b* which are operated respectively by pushbuttons 24 and 22. Further portions of switch sections 41*a* and 41*b* are connected to the negative terminal of battery 35. The collector of transistor 39 is connected to both inductance coil 43 and inductance coil 44. The other terminals of these coils are connected to fixed portions of switch sections 41*a* and 41*b* which are adapted to be coupled to the negative terminal of the battery when either switch section is operated. A terminal of each feedback coil 46 and 47 is bypassed to B— through the capacitor 49. The other terminals of these coils are connected to fixed portions of switch sections 41*a* and 41*b* so that either coil may be connected to the base of transistor 39 when the associated switch section is operated. Capacitor 51 is connected between the collector of the transistor and the negative terminal of battery 35 so that this capacitor is across either coil 43 or coil 44 when a switch section is operated. Capacitor 51** serves to tune the coils when so connected.

The base of transistor 39 is biased through the by-passed bias network 53 which is connected between the positive terminal battery 35 and the interconnection of coils 46 and 47, either of which will provide a D.C. path to the base when a switch section is operated. A stabilizing resistor 55 is also connected to the junction of coils 46, 47 and the collector of transistor 39.

As shown in FIG. 2 coils 43 and 46 are supported on a cylindrical coil form 58 within which is positioned a hollow rod 59 composed of nickel which is highly magnetostrictive. The rod acts as a magnetostriction transducer which supplies a feedback path between the coils in the transistor oscillator circuit for sustaining oscillation at the mechanical resonant frequency of the rod. On the end of the rod facing outwardly of the transmitter chassis 61 there is supported a circular aluminum diaphragm 63 which provides air coupling for radiation of ultrasonic vibrations produced by longitudinal oscillation of rod 59. The coil form 58 is supported at the ends thereof by supports 65 and the coil and rod assembly is supported at the center thereof by the support 67, where there is essentially a null area so that the support 67 has practically no effect on the magnetostrictive action. The coil form 58 does not adversely affect the rod action since the motion of the rod is along its longitudinal axis.

In close proximity to rod 59 and parallel thereto there is positioned a permanent magnet 69 which has its poles at the ends, in order to provide a magnetic bias for rod 59. The bias is stronger than the induced field from one half of the oscillation signal and the bias flux density is about 60% of the saturation value of the rod. This prevents the transducer from doubling the frequency of the oscillator signal. This frequency doubling would occur without the magnetic bias due to the fact that the transducer is insentitive to the polarity of the driving wave form, the change in length being in the same direction regardless of the polarity of the oscillator signal.

The particular length of rod 59 is selected so that the magnetostrictive action thereof peaks at a frequency of 38.5 kilocycles and the feedback between coils 43 and 46 in the oscillator circuit is provided through the magnetostrictive action of this rod which thus determines the frequency of oscillator operation. The proper length for a particular frequency is determined from the frequency length constant for the magnetostrictive material in use. This material should have a low temperature coefficient to minimize frequency shift with temperature change. The circular diaphragm 63 has a diameter substantially equal to a multiple of the wave length at which the oscillation takes place and this maximizes the flexing of this radiator and thus increases the transfer of energy from the rod into the air as the diaphragm is flexed by longitudinal oscillation of rod 59. The diaphragm should be light in weight to reduce damping of the rod. Rod 59 is made hollow to reduce eddy current losses therein.

In a transmitter of practical construction, the transducer formed by the rod 59, its radiator diaphragm and the inductance coils was constructed as follows:

| | | |
|---|---|---|
| Signal frequency | 38.5 kilocycles or 41.5 kilocycles | |
| Material of rod 59 | Nickel type "A" | |
| | 38.5 kc. | 41.5 kc. |
| Rod length | 2.31" | 2.06" |
| Rod diameter | .250" | .250" |
| Rod wall thickness | .013" | .013" |
| Material of diaphragm 63 | Aluminum | |
| Diaphragm diameter | .720" | |
| Diaphragm thickness | .018" | |
| Spacing of inductance | .562" | |
| Coils 43, 46, 44, 47 | 5 mh. each | |

In this transmitter the diaphragm 63 has a diameter slightly over twice the wavelength of the signal at 38.5 kc.

As is apparent in FIG. 2, the battery 35 is supported at the portion of chassis 61 which is held in the palm of the hand of a user of the device and switch sections 41*a*, 41*b* are disposed in the center and forward of the position of the battery. Pushbuttons 24 and 22 are thus conveniently available for operation of either switch section. The magnetostrictive rod 59, diaphragm 63 and biasing magnet 69 together with coils 43 and 46 form a transducer which is positioned on one side of the switch sections and magnetostrictive rod 70 together with its associated diaphragm 72 and biasing permanent magnet 74 are positioned on the other side of the switch sections. The particular construction of the transducer employing rod 70 corresponds in detail to that employing rod 59 except that the length is shorter so that oscillation takes place at 41.5 kilocycles. Accordingly, operation of button 22 will connect the battery and transducer to the oscillator circuit to produce a supersonic signal of 41.5 kilocycles which is used to turn the television receiver on or off, and operation of pushbutton 24 will similarly connect the battery and other transducer to cause a supersonic signal of 38.5 kilocycles to be produced, which serves to operate the channel changing mechanism in the television receiver 10.

The invention thus provides a miniaturized, unitary, continuous tone transmitter producing a frequency controlled supersonic signal having a relatively high power output for operation over television viewing distances. The device described produces a stable signal in an efficient manner so that it is fully practical for commercial use.

We claim:

1. In a remote control system, a hand-held transmitter for producing supersonic energy of particular frequency and radiating the same into space, including in combination, oscillator circuit means including a transistor and an energizing battery and biasing means for said transistor, a magnetostrictive rod of uniform diameter which diameter is substantial compared to the wavelength of the particular frequency, said oscillator circuit means including first and second feedback inductors connected to said transistor and supported about said magnetostrictive rod, switch means for operatively coupling said battery in said oscillator circuit means for energization thereof, said magnetostrictive rod coupling said first and second inductors and having a selected length to oscillate longitudinally at the particular frequency for establishing the feedback frequency in said oscillator circuit means, a flexible radiating disc secured to one end of said rod and having a diameter substantially equal to a multiple of the wavelength of the particular frequency for maximizing the energy transfer from said rod into space, whereby operation of said switch means provides radiation of supersonic energy for remote control purposes.

2. A transmitter for producing supersonic energy of particular frequency and radiating the same in space, including in combination, oscillator circuit means including a transistor and an energizing battery and biasing means for said transistor, a hollow magnetostrictive rod of uniform diameter which diameter is substantial compared to the wavelength of the particular frequency, said oscillator circuit means including first and second feedback inductors connected to said transistor and disposed about said rod and magnetically coupled therethrough, switch means for operatively connecting said battery in said oscillator circuit means, a permanent magnet positioned in proximity to said rod for magnetically biasing the same along the longitudinal axis thereof, said rod having a selected length to oscillate longitudinally at the particular frequency for establishing the feedback frequency of said oscillator circuit means, a flexible radiating disc secured to one end of said rod and having a diameter substantially equal to twice the wavelength of the particular frequency for maximizing the energy transfer from said rod into space, whereby operation of said switch means provides controlled radiation of supersonic energy.

References Cited by the Examiner

UNITED STATES PATENTS

| | | | |
|---|---|---|---|
| 1,277,562 | 9/1918 | Fessenden. | |
| 1,962,154 | 6/1934 | Pierce | 340—11 |
| 1,982,341 | 11/1934 | Hitchcock | 340—11 |
| 2,044,807 | 6/1936 | Noyes | 181—.5 |
| 2,328,496 | 7/1943 | Rocard | 340—11 |
| 2,345,472 | 3/1944 | Goldsmith | 181—.5 |
| 2,638,577 | 6/1953 | Harris | 340—11 X |
| 2,930,955 | 3/1960 | Bourget et al. | 318—16 |
| 3,075,171 | 1/1963 | Hansen | 325—392 |

BENJAMIN A. BORCHELT, *Primary Examiner.*

CHESTER L. JUSTUS, SAMUEL FEINBERG, *Examiners.*